United States Patent
Claypool, III et al.

(10) Patent No.: US 9,959,161 B2
(45) Date of Patent: May 1, 2018

(54) AUTOMATED TICKETING ANALYTICS

(71) Applicant: INTERNATIONAL BUSINESS MACHINES CORPORATION, Armonk, NY (US)

(72) Inventors: David F. Claypool, III, Firestone, CO (US); Mark B. Cowland, Bussum (NL); Dorothy M. Keeler, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 153 days.

(21) Appl. No.: 14/873,794

(22) Filed: Oct. 2, 2015

(65) Prior Publication Data
US 2017/0097861 A1   Apr. 6, 2017

(51) Int. Cl.
*G06F 11/07* (2006.01)
*G06F 11/30* (2006.01)
(Continued)

(52) U.S. Cl.
CPC ........ *G06F 11/0793* (2013.01); *G06F 11/079* (2013.01); *G06F 11/0709* (2013.01);
(Continued)

(58) Field of Classification Search
CPC ............... G06F 11/079; G06F 11/0709; G06F 11/0751; G06F 11/0772; G06F 11/0787; G06F 11/0793; H04L 41/5074
See application file for complete search history.

(56) References Cited

U.S. PATENT DOCUMENTS 5,345,590 A * 9/1994 Ault ................... G06F 11/0712
  711/170
5,603,029 A * 2/1997 Aman .................. G06F 9/505
  707/999.2
(Continued)

OTHER PUBLICATIONS

NB9404115, Customizing the LAN NetView Fix Action Table, IBM, IBM Technical Disclosure Bulletin, Apr. 1, 1994, pp. 115-116.*

(Continued)

*Primary Examiner* — Paul Contino
(74) *Attorney, Agent, or Firm* — Law Office of Jim Boice

(57) ABSTRACT

A computer-implemented method, system, and/or computer program product utilizes Automated Ticketing (AT) Analytics to create a recommendation file of routines and to automatically create a work ticket in response to a message. One or more processors identify messages related to a Logical Partition (LPAR) for automated ticketing. The messages identify an operational anomaly in the LPAR used by a computer system, and are based on sensor readings from hardware sensors and software programs within the computer system. The identified messages identify which messages are to be auto ticketed as a work ticket for the computer system. In response to updates to rules for automated ticketing being initiated, the processor(s) identify trends using an automated message analysis and an automation routine identification to automatically trigger a generation of the work ticket. The processors(s) automatically create and execute the work ticket to correct a new operational anomaly in the LPAR.

15 Claims, 5 Drawing Sheets

(51) Int. Cl.
  *G06F 11/34* (2006.01)
  *H04L 12/24* (2006.01)
(52) U.S. Cl.
  CPC ...... *G06F 11/0751* (2013.01); *G06F 11/0766* (2013.01); *G06F 11/0772* (2013.01); *G06F 11/0775* (2013.01); *G06F 11/0787* (2013.01); *G06F 11/301* (2013.01); *G06F 11/302* (2013.01); *G06F 11/3058* (2013.01); *G06F 11/34* (2013.01); *G06F 11/3428* (2013.01); *H04L 41/14* (2013.01)

(56) References Cited

U.S. PATENT DOCUMENTS

| | | | | |
|---|---|---|---|---|
| 5,634,008 | A * | 5/1997 | Gaffaney | G06F 11/3409 709/224 |
| 6,832,341 | B1 * | 12/2004 | Vijayan | G06F 11/0709 709/224 |
| 7,266,734 | B2 | 9/2007 | Chavez et al. | |
| 2003/0221123 | A1 * | 11/2003 | Beavers | G06F 21/55 726/23 |
| 2004/0117470 | A1 * | 6/2004 | Rehm | H04L 41/064 709/223 |
| 2004/0210793 | A1 * | 10/2004 | Chokshi | G06F 11/0712 714/5.11 |
| 2007/0133755 | A1 * | 6/2007 | Jean | H04M 3/247 379/1.01 |
| 2008/0155564 | A1 * | 6/2008 | Shcherbina | G06Q 10/06 719/318 |
| 2010/0161539 | A1 * | 6/2010 | Kandanala | H04L 41/5074 706/47 |
| 2011/0153749 | A1 * | 6/2011 | Howcroft | H04L 41/5074 709/206 |
| 2011/0295872 | A1 * | 12/2011 | Supak | G06F 17/30554 707/769 |
| 2013/0198116 | A1 * | 8/2013 | Bhamidipaty | H04L 41/5074 706/12 |
| 2015/0081376 | A1 | 3/2015 | Cardone et al. | |

OTHER PUBLICATIONS

NN9412533, LAN Netview Fix—Action Table System Identifiers, IBM, IBM Technical Disclosure Bulletin, Dec. 1, 1994, pp. 533-534.*
NB9404259, Providing Dynamic Switching between Logging NetView Fix, IBM, IBM Technical Disclosure Bulletin, Apr. 1, 1994, pp. 259-260.*
Mynhardt, Hennie et al. IBM DB2 Performance Solutions. 2014. IBM Corporation.*
Tivoli NetView for OS/390 Automation Guide Chapter 13 The Automation Table. Nov. 1999 [retrieved on Apr. 13, 2017]. Tivoli Systems, Inc. Version 1 Release 3. Retrieved from the Internet <URL:http://publib.boulder.ibm.com/tividd/td/netview390/dqal2mst/en_US/HTML/dqal2m20.htm>.*
Tivoli NetView for OS/390 Automation Guide Chapter 2 Overview of Automation Products. Nov. 1999 [retrieved on Apr. 13, 2017]. Tivoli Systems, Inc. Version 1 Release 3. Retrieved from the Internet <URL:http://publib.boulder.ibm.com/tividd/td/netview390/dqal2mst/en_US/HTML/dqal2m06.htm#HDRINTERFC>.*
Customization Guide NetView for OS/390 Customization Guide, Tivoli Systems, Version 1.2, Jun. 1998 [retrieved on Apr. 11, 2017]. Retrieved from the Internet <URL:http://publib.boulder.ibm.com/tividd/td/netview390/customgd12/en_US/HTML/dqdl1m10.htm>.*
IBM Software Group Cross Sell Reference Guide vol. 1: Branded Middleware Edition. Apr. 2008. IBM.*
Customizing the LAN NetView Fix Action Table. Apr. 1, 1994. IP.com.*
NetView Performance Monitor Version 2 Release 2 Software Announcement. Jun. 7, 1994 [retrieved on Apr. 13, 2017]. Retrieved from the Internet <URL:https://www-01.ibm.com/ . . . mon/ssi/cgi-bin/ssialias?subtype=ca&infotype=an&appname=iSource&supplier=897&letternum=ENUS294-355>. pp. 294-355.*
What is message capturing. Nov. 29, 2013 [retrieve on Apr. 11, 2017]. IBM Developer Networks. Retrieved from the Internet <URL:https://www.ibm.com/developerworks/community/wikis/home?lang=en#!/wiki/Tivoli%20System%20Automation/page/What%20is%20message%20capturing>.*
Blea, Randy et al. IBM Tivoli Productivity Center for Replication 5..1 Overview and z/OS Basic HyperSwap Overview. 2012. IBM Corporation.*
NetView for OS/390 User's Guide Chapter 13 Using the NetView Automation Table. Jun. 1998 [retrieved on Apr. 11, 2017]. Tivoli Systems. Version 1.2. Retrieved from the Internet <URL:http://publib.boulder.ibm.com/tividd/td/netview390/netviewug12/en_US/HTML/dqql1m25.htm>.*

* cited by examiner

AUTOMATED TICKETING ANALYTICS

BACKGROUND

The present disclosure relates to the field of computer systems, and specifically to computer systems that experience operational anomalies. Still more specifically, the present disclosure related to automatically generating work tickets for operational anomalies in computer systems.

SUMMARY

A computer-implemented method, system, and/or computer program product utilizes Automated Ticketing (AT) Analytics to create a recommendation file of routines and to automatically create a work ticket in response to a message. One or more processors identify messages related to a Logical Partition (LPAR) for automated ticketing to an account as a BASELINE. The messages identify an operational anomaly in the LPAR used by a computer system, and are based on sensor readings from hardware sensors and software programs within the computer system. The identified messages identify which messages are to be auto ticketed as a work ticket for the computer system. The processors(s) initiate updates to rules for said automated ticketing. In response to the updates to the rules being initiated, the processor(s) identify trends using an automated message analysis and an automation routine identification to automatically trigger a generation of the work ticket. The processor(s) execute an analytic routine in response to an update being made to a particular message. The analytic routine includes an automated message analysis and an automation routine identification. The processor(s) automatically produce a recommendation for correcting the operational anomaly in the LPAR based on said analytic routine by automatically creating the work ticket to correct the operational anomaly, and then store the recommendation in a recommendation file. The processors(s) retrieve the recommendation and apply the recommendation to a subsequent (new or existing) message that describes a subsequent operational anomaly in the LPAR, or a suggested update to an existing anomaly (e.g., a change in the message severity or additional automation routines). The processor(s) then automatically create the work ticket to correct the new operational anomaly in the LPAR, and process the work ticket to correct the new operational anomaly in the LPAR.

DETAILED DESCRIPTION

Figure 1:
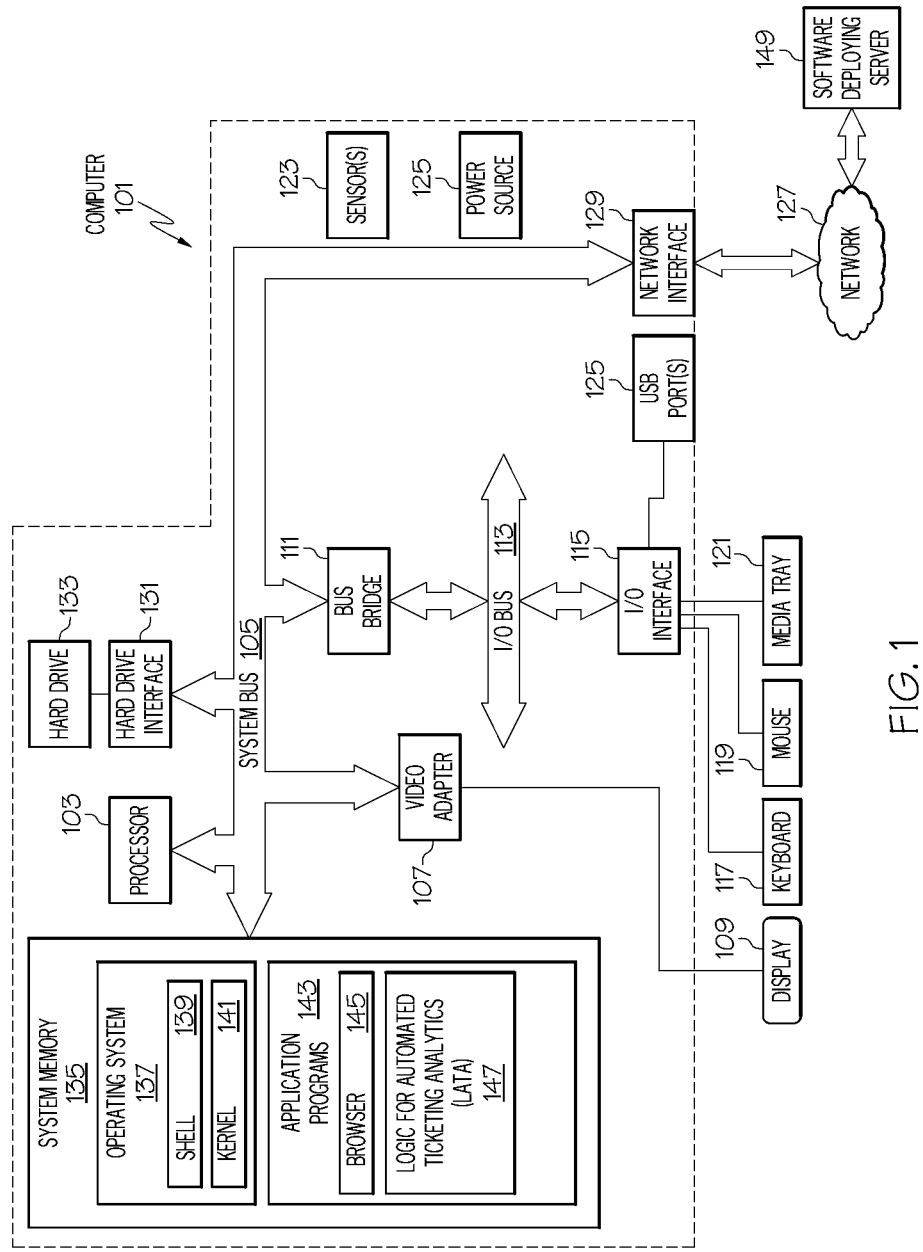
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or server 201 depicted in FIG. 2.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, and/or a media tray 121 (which may include storage devices such as CD-ROM drives, multi-media interfaces, etc.). While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129 to a network 127. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc. Network 127 may connect computer 101 to a software deploying server 149.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Automated Ticketing Analytics (LATA) 147. LATA 147 includes code for implementing the processes described below, including those described in FIGS. 2-5.

Also within computer 101 are sensor(s) 123. Sensor(s) 123 are physical hardware sensors (not software) that monitor operational conditions of computer 101, including by not limited to temperature sensors (that detect the temperature of the overall system or individual components of computer 101) sensors, humidity sensors (that detect humidity levels within a housing of computer 101 or ambient humidity levels around computer 101), bus bandwidth sensors (e.g., that detect the amount of data traffic on the system bus 105 and/or the I/O bus 113), motion sensors (that detect anomalous vibration in fans (not shown) within the computer 101 (e.g., as part of a heat sink on processor 103), hard drive 133, etc.), accelerometers (that detect computer 101 being dropped or otherwise subjected to a violent motion), etc.

Also within computer 101 is a power source 125. When plugged into a nearly unlimited power supply (e.g., a power grid from a power company), the power source 125 is the system of outlets, wires, transformers that support the power grid. However, when part of a mobile computing device, power source 125 is a battery.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As described herein, the present invention presents an Automated Ticketing (AT) Analytics, which utilizes unique Analytic Routines that analyze ticketing and automation trends, which are used to produce: 1) a file of recommendations for the improvement of messages and alerts that result in an incident ticket; and 2) identifying suitable Automation Routines that are used to resolve the underlying incident automatically. Presented herein is a process flow that includes unique Analytic Routines that produce the recommendations file.

Deployment of a fully automated ticketing solution, which integrates with automation, remains a key transformation from "Monitoring Events" to "Monitoring Exceptions". It results in reduction of human error, reduced mean time to recovery, and reduction of source spend while greatly increasing quality of service delivery with consistent automation. Use of the presently disclosed and new and novel AT Analytics provides an immediate value add to new fully automated ticketing environments, and supplements environments with existing automated ticketing solutions. It does this by analyzing trends, and identifying additional messages and/or alerts that are made eligible for automated ticketing and/or automation.

There are a number of problems, which the present invention overcomes, that both inhibit and restrict the effectiveness of an integrated automated ticketing solution. Some of these are:

Cost Problem: Lack of standardization and requisite data points, combined with inability to control variance across potential scope, normally makes an auto-ticketing project too expensive and impractical. Impact: An enormous initial investment is required, and a large life cycle management budget is required. These facts often render investment approval for such projects impossible.

Technical problem: The large number of automated ticketing solutions, combined with the large variance in an environment (often lack of standardization), make any manual EVENT/MESSAGE TO TICKET/AUTOMATE trend analysis difficulty or impossible. Impact: This restricts the effectiveness of all solutions. It makes a solution dependent on manual, local actions, to "enhance" them and keep them "current" ("current" means new messages resulting from new software modifications/releases).

Architectural problem: Environments such as mainframes generally have strict architectural and security requirements. Impact: Any trend type analysis and/or impact on existing solutions/automation must carefully consider the specific environmental architecture.

Sharing of Intellectual Capital problem: There is often locally defined automation, which could benefit multiple environments, which is not available for reuse. Impact: This inhibits the effectiveness of automated ticketing, by not exploiting automation that has been identified, and developed.

The present invention utilizes a process flow that includes unique Analytic Routines, which produce recommendations to a centralized file for consumption and identifies suitable automation routines. The method used to provide the core Automated Ticketing (AT) Analytics function which is used to produce a list of messages and/or Alerts to automatically ticket and/or automate, is:

1: Generation of a centralized file containing all messages and alerts that are being automatically ticketed and/or automated;

2. Automatically executing analysis routines whenever updates are made to individual configurations; and 3. Producing AT Analytics recommendations to a centralized file With reference now to FIG. 2, a components and process flow chart 202 showing exemplary components/processes utilized in the present invention is depicted.

As shown in block 1, messages that are to be ticketed and/or automated are identified. The system (e.g., server 201, which is analogous to computer 101 shown in FIG. 1) defines messages (or alerts) for ticketing and/or Automation for a Logical Partition (LPAR) (e.g., an LPAR of hardware, storage, software) in an account as a BASELINE. Best practice messages, plus additional subject matter expert identified messages, are identified for automated ticketing (including incident severity) and automated action(s). A "message" is what identifies an issue in an LPAR, which the AT analytics described herein will use to determine if the issue should be auto ticketed and/or automated. A "best practice message" is a message that has been identified by the system using previous analytics and/or a global subject matter expert as an issue that should always be ticketed.

As shown in block 2, updates for ticketing and/or automation rules/scripts are initiated. Export routines are initiated and updates are produced (if necessary) in a format required by automation and auto ticketing solution, to define what is ticketed and automated (as previously identified). To streamline the end-to-end process (from the time the unique list of recommendations is produced, to the time these recommendations are implemented), export routines such as a z/OS feed or a comma separated file (csv) is utilized in one or more embodiments of the present invention.

z/OS—The z/OS feed is for the LPAR message worksheets, which define the actions that should be taken for each message that has been defined. The worksheets can be exported and used as input to mainframe processes (e.g., when no manipulation of the exported data is required). The mainframe processes produce Message Automation Table (MAT) statements, and the message suppression definitions, used by the mainframe processes. In one embodiment of the present invention, the MAT statements identify Virtual Telecommunication Access Method (VTAM) network performance and utilization information, determines required network changes to improve performance, identifies network elements responsible for performance degradation, and enables automated responses to performance problems.

csv—The Account and LPAR details can be exported as a csv file (e.g., file 204 depicted in FIG. 2), and used to satisfy specific requirements identified by the system.

Figure 2:
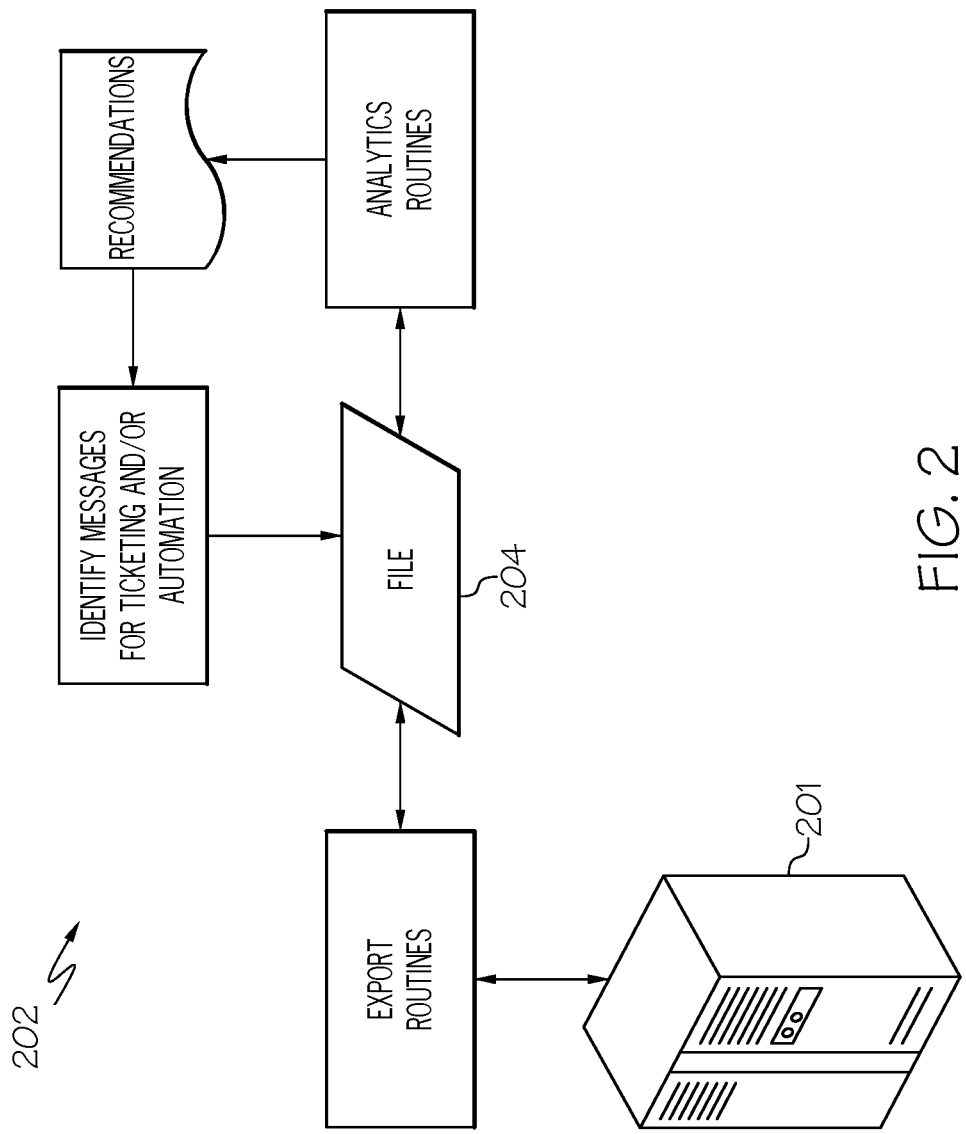
FIG. 2 illustrates an overall view of components used and processes performed in accordance with one or more embodiments of the present invention.

As depicted in block 3 of FIG. 2, Analytic Routines that identify trends, based on weighted values, are automatically triggered whenever updates are made. Analytic Routines provide: 1) Automated Message Analysis (trends based on weighted values), and 2) Automated routine identification and knowledge portals.

1) Automated Message Analysis

Figure 3:
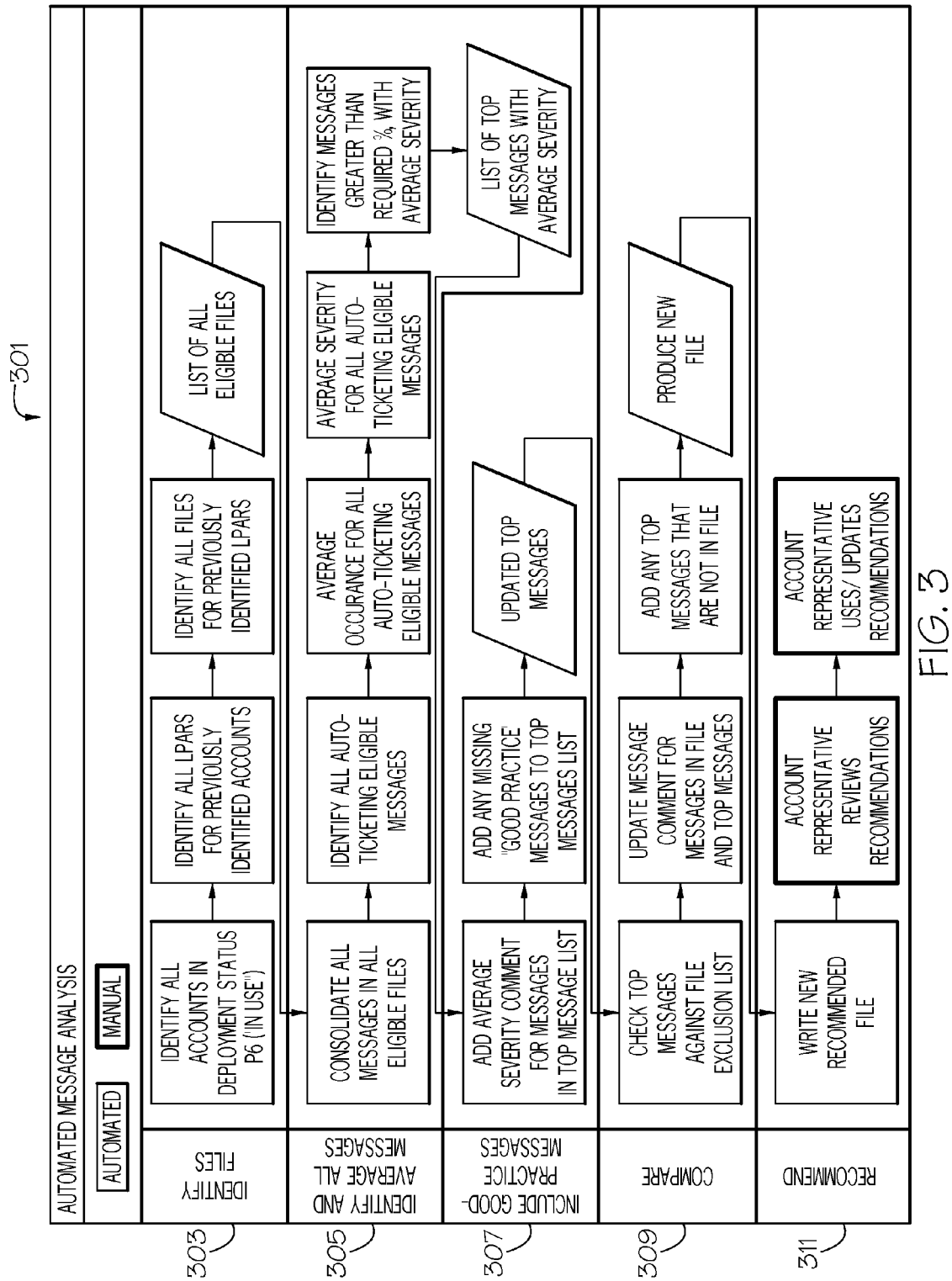
FIG. 3 depicts a swim-lane flowchart of automated message analysis in accordance with one or more embodiments of the present invention.

The steps that comprise the automated message analysis function are depicted in the swim lane functional flowchart 301 shown in FIG. 3. This function is run automatically and/or frequently (timer based and/or trigger based following updates to the configuration) to produce recommendations that are based on the most recent trends.

As shown in swim lane 303 in FIG. 3, the system begins by identifying all accounts where automated ticketing is deployed, thereby identifying all LPARs that are of interest. As shown in swim lane 305, the system then identifies and averages all messages that are coming from the identified accounts/LPARs, and creates a list of "top" messages, which are used in x % of LPARS (where "x" is specified). The severity of each message/alert is averaged from the value of all occurrences. The process shown in swim lane 305 is performed by the following steps:

I. Producing one list containing all messages spanning all previously identified accounts (identified in swim land 303). An example of such a list is:
 ZOSmsg1, account 1, auto ticketing YES, severity 3
 DB2msg1, account 1, auto ticketing YES, severity 2
 ZOSmsg2, account 1, auto ticketing YES, severity 4
 DB2msg2, account 1, auto ticketing YES, severity 2
 ZOSmsg5, account 2, auto ticketing NO, severity 5
 ZOSmsg1, account 3, auto ticketing YES, severity 1
 ZOSmsg3, account 1, auto ticketing YES, severity 2

II. Keep only auto ticketed messages, and strike through the rest, such as:
 ZOSmsg1, account 1, auto ticketing YES, severity 3
 DB2msg1, account 1, auto ticketing YES, severity 2
 ZOSmsg2, account 1, auto ticketing YES, severity 4
 DB2msg2, account 1, auto ticketing YES, severity 2
 ZOSmsg5, account 2, auto ticketing NO, severity 5
 ZOSmsg1, account 3, auto ticketing YES, severity 1
 ZOSmsg3, account 1, auto ticketing YES, severity 2

III. Average occurrence and severity of messages (weighted by message type and number of accounts), such as:
 ZOSmsg1, auto ticketing YES, type zOS, 100%, average severity 2
 ZOSmsg2, auto ticketing YES, type zOS, 50%, average severity 4
 ZOSmsg3, auto ticketing YES, type zOS, 50%, average severity 2
 DB2msg1, auto ticketing YES, type DB2, 100%, average severity 2
 DB2msg2, auto ticketing YES, type DB2, 100%, average severity 2 (two ZOS accounts, 1 DB2 account)

The DB2msg's (DB2msg1 and DB2msg2) have a 100% occurrence, since there is only 1 LPAR where DB2 is run.

III. Only keep "top" messages, such as those that occur >80% (variable, to be determined):
 ZOSmsg1, auto ticketing YES, type zOS, 100%, average severity 2
 ZOSmsg2, auto ticketing YES, type zOS, 50%, average severity 4
 ZOSmsg3, auto ticketing YES, type zOS, 50%, average severity 2
 DB2msg1, auto ticketing YES, type DB2, 100%, average severity 2
 DB2msg2, auto ticketing YES, type DB2, 100%, average severity 2

Returning to FIG. 3, as shown in swim lane 307 the system identifies best practice messages. The system adds any best practice messages, which are not already included in the "top" message list, such as:
 ZOSmsg1, auto ticketing YES, type zOS, 100%, average severity 2 (a best practice message that is already present)
 ZOSmsg5, severity 3 (a newly added best practice message)
 DB2msg1, auto ticketing YES, type DB2, 100%, average severity 2 (a best practice message that is already present)
 DB2msg2, auto ticketing YES, type DB2, 100%, average severity 2 (a best practice message that is already present)
 DB2msg3, severity 4 (a newly added best practice message)

As shown in swim lane 309, the system then performs a comparison operation to identify any "exclusions" that an LPAR may have defined (optional) against the "top" average list (including "best practice messages"), such as ignoring any DB2msg8 message.

Any differences are then identified (omitting "exclusions"), such as in the following example:
 I. BASELINE LPAR1:
 ZOSmsg1, auto ticketing YES, severity 2
 ZOSmsg8, auto ticketing YES, severity 3
 DB2msg1, auto ticketing YES, severity 2
 DB2msg2, auto ticketing YES, severity 3
 DB2msg3, auto ticketing YES, severity 4
 DB2msg9, auto ticketing YES, severity 5
 II. Top average list:
 ZOSmsg1, auto ticketing YES, type zOS, 100%, average severity 2
 ZOSmsg5, severity 3 DB2msg1, auto ticketing YES, type DB2, 100%, average severity 2
 DB2msg2, auto ticketing YES, type DB2, 100%, average severity 2 DB2msg3, severity 4
 III. Identify differences:
 ZOSmsg1, auto ticketing YES, severity 2 Match
 ZOSmsg5, auto ticketing YES, severity 3 Add Best Practice Message
 ZOSmsg8, auto ticketing YES, severity 3 In Exclusion list. Not in "top" list
 DB2msg1, auto ticketing YES, severity 2 Match
 DB2msg2, auto ticketing YES, severity 3 Average severity 2 in "top" list
 DB2msg3, auto ticketing YES, severity 4 Match
 DB2msg9, auto ticketing YES, severity 5 Not in TOP list As shown in swim lane 311, the system them produces a recommendation file for every LPAR, such as:

ZOSmsg5, auto ticketing YES, severity 3 Add Best Practice Message

DB2msg2, auto ticketing YES, severity 3 Average severity 2

DB2msg9, auto ticketing YES, severity 5 Not in "top" list

Returning now to FIG. 2, a file of recommendations is generated, as depicted in block 4 in FIG. 2.

A list that clearly identifies differences between an LPAR's current BASELINE, and what is recommended, is produced. An exemplary list may be developed based on:
  Add: ZOSmsg5, with severity 3
  Modify: DB2msg2 to severity 2
  Delete: DB2msg9

A review is then conducted by the system to accept or reject all, or a subset, of auto ticketing recommendations. This leads to the production of a new auto ticketing BASELINE file. The messages in this new auto ticketing BASELINE compare an automation flag (as described below in FIG. 4) that is associated with each message. If the automation flag is not set, then a check is performed to identify any automation routines that have been denied for each message (automation routines provided by global subject matter expert community). Any matches that are found are highlighted. An example of this process is shown as:
  ZOSmsg1, auto ticketing YES, severity 2 Possible Automation routine: abc, def, ghi found
  ZOSmsg5, auto ticketing YES, severity 3 Message currently automated
    ZOSmsg8, auto ticketing YES, severity 3 No Automation routines found
    DB2msg1, auto ticketing YES, severity 2 Message currently automated
    DB2msg2, auto ticketing YES, severity 3 Message currently automated
    DB2msg3, auto ticketing YES, severity 4 No Automation routines found In one embodiment of the present invention, a manual review is conducted to evaluate, and accept or reject, automation recommendations.

The process then repeats whenever any update is made (e.g., an account accepts recommendations or adds/deletes/modifies its BASELINE). Subsequent steps are then automatically initiated to ensure recommendation lists always remain current.

2) Automated Routine Identification and Knowledge Portals

Figure 4:
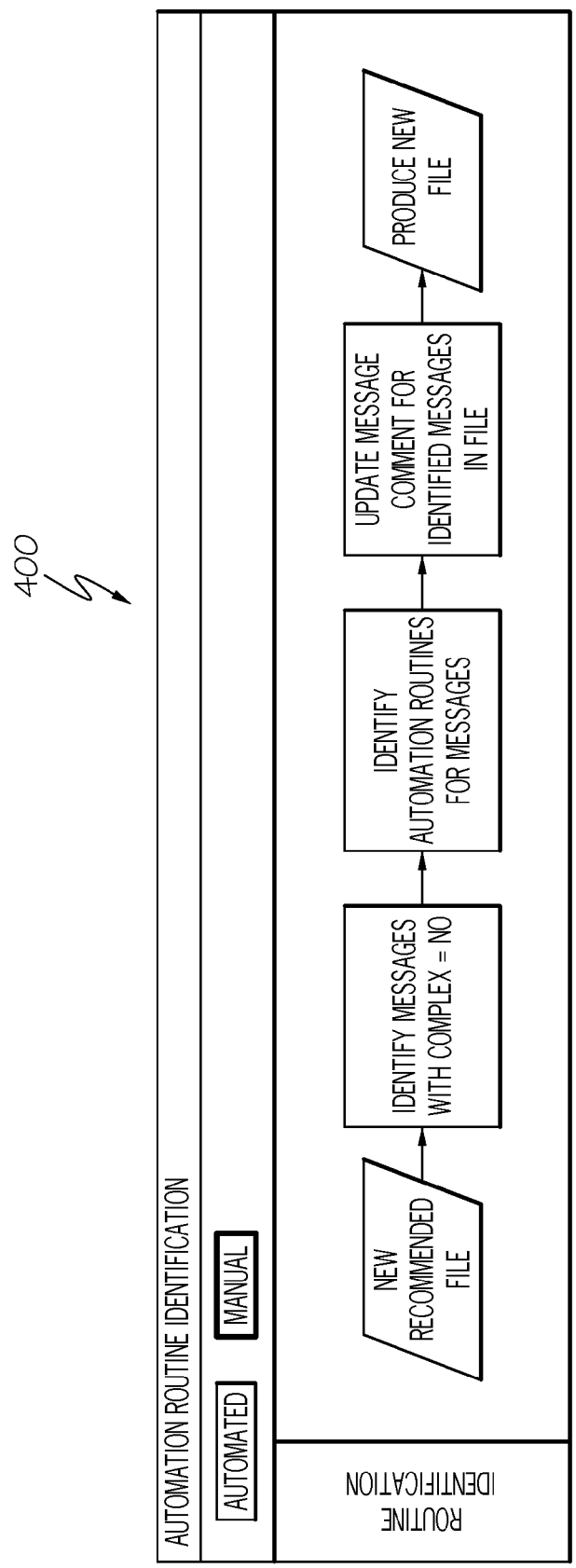
FIG. 4 illustrates a high level flowchart of automation routine identification in accordance with one or more embodiments of the present invention.

With reference now to FIG. 4, a flow-chart describing an automated routine identification and knowledge portal is presented.

Events that are identified for Automated Ticketing and/or suppression may also be candidates for automation routines. These routines may potentially resolve an issue, for which an incident ticket would otherwise be required. The AT Analytics invention described herein provides two mechanisms to identify such automation routines.

Following the Compare function described in swim lane 309 in FIG. 3, the following Automation Routine Identification function depicted in FIG. 4 is executed.

A WEB interface (e.g., accessible through the World Wide Web) to routines that have been developed by subject mater experts provides a list of messages, for which automation routines have been defined. Selection of such message routines provides:
  A description of the routine;
  The developer of the routine;
  Contact details for the routine;
  A uniform resource locator (url) to the routine, or the actual ASCII source of the routine; and
  The ability to download the ASCII source (when provided).

Thus, by utilizing the Automation routine WEB interface, a user may also submit a routine (either new or an update to an existing routine), which can then be evaluated for use by other representatives.

Figure 5:
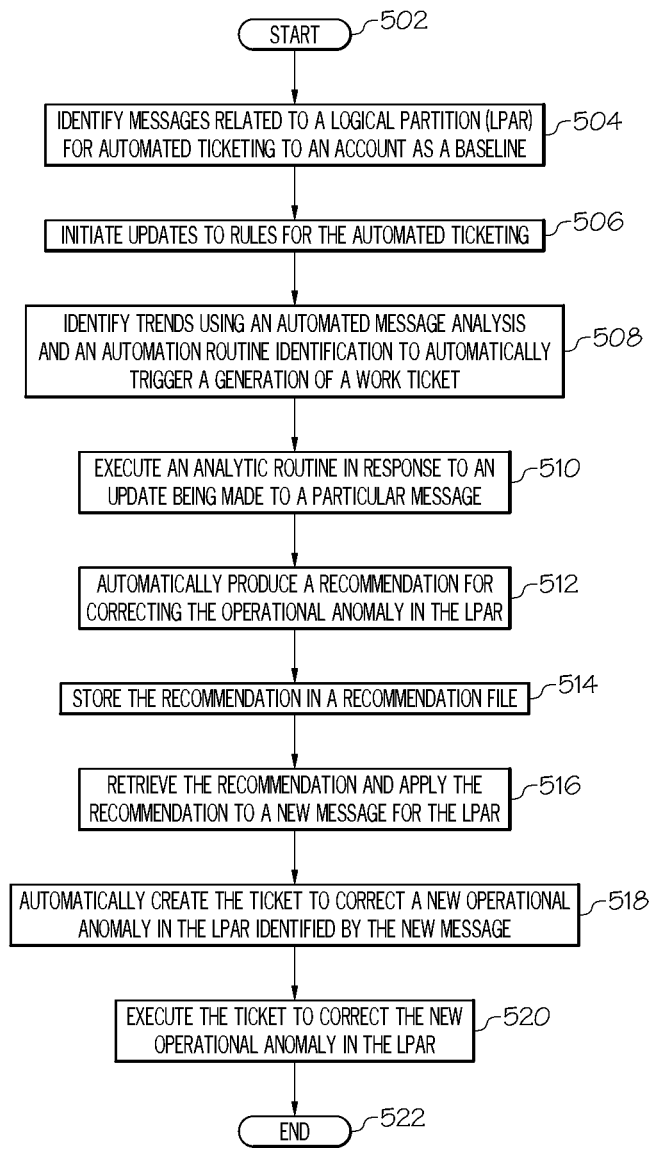
FIG. 5 is a high-level flow chart of one or more steps performed by one or more processors and/or other hardware to automatically generate analytics and recommendations for job tickets in a computer system.

With reference now to FIG. 5, a high-level flow chart of one or more steps performed by one or more processors and/or other hardware to utilize Automated Ticketing (AT) Analytics to create a recommendation file of routines and to automatically create a work ticket in response to a message in a computer system is presented. The processes/steps shown in FIG. 5 are detailed in the figures and description presented above.

After initiator block 502, one or more processors identify messages related to a Logical Partition (LPAR) for automated ticketing to an account as a BASELINE, as depicted in block 504. The messages identify an operational anomaly in the LPAR used by a computer system, and are based on sensor readings from hardware sensors and software programs (e.g., monitoring software) within the computer system, leading to identified messages that identify which messages are to be auto ticketed as a work ticket for the computer system.

As described in block 506, the processor(s) initiate updates to rules for the automated ticketing.

As described in block 508, the processor(s), in response to the updates to the rules being initiated, identify trends using an automated message analysis and an automation routine identification to automatically trigger a generation of the work ticket.

As described in block 510, the processor(s) execute an analytic routine in response to an update being made to a particular message. The analytic routine includes an automated message analysis and an automation routine identification.

As described in block 512, the processor(s) automatically produce a recommendation for correcting the operational anomaly in the LPAR based on said analytic routine by automatically creating the work ticket to correct the operational anomaly.

As described in block 514, the processor(s) store the recommendation in a recommendation file.

As depicted in block 516, the processor(s) retrieve the recommendation and apply the recommendation to a new message that describes a new operational anomaly in the LPAR.

As depicted in block 518, the processor(s) automatically create the work ticket to correct the new operational anomaly in the LPAR.

As depicted in block 520, the processor(s) execute the work ticket to correct the new operational anomaly in the LPAR.

The flow-chart ends at terminator block 522.

In one embodiment of the present invention, the LPAR is a partition of a software program.

In one embodiment of the present invention, the processors(s) export the recommendation file as a z/OS feed. The z/OS feed populates an LPAR message worksheet. The LPAR message worksheet defines actions to be taken in response to the message. The LPAR message worksheet is used as an input to mainframe processes. The mainframe processes produce Message Automation Table (MAT) statements and message suppression definitions used by the mainframe processes. In one embodiment of the present invention, the MAT statements identify Virtual Telecommunication Access Method (VTAM) network performance and utilization information, determines required network changes to improve performance, identifies network elements responsible for performance degradation, and enables automated responses to performance problems.

In one embodiment of the present invention, the processor(s) export the recommendation file as a comma separated value (csv) file. The csv file identifies specific operational requirements of the system.

In one embodiment of the present invention, the automated message analysis introduced above include the processor(s): identifying all accounts and LPARs where automated ticketing is deployed; identifying and averaging messages that are coming from identified accounts and identified LPARs as a top average message list; adding best practices messages to the top average message list; comparing exclusions that have been defined by the LPAR to the top average message list; and generating the recommendation file for the LPAR.

In one embodiment of the present invention, automation routine identification introduced above includes the processor(s): receiving a selection of the message(s) based on a description of a message routine and an ability to download an ASCII source of the routine; and submitting the message routine to the recommendation file.

The advantages provided by AT Analytics described herein include but are not limited to, providing savings and ongoing cost control by: providing Key Enablers in Transformation from "Monitoring Events" to "Monitoring Exceptions"; providing Cost Control via Automation and Central Management of Requisite Data Points; accelerating deployment of automated ticketing solution by providing centralized data storage of message lists, which can be reviewed and updated by multiple support group representatives; ongoing productivity improvement via automated analysis and message list recommendations (Best Practices and Common Messages), which improves quality of service delivery, by reducing mean time to recovery, and reducing human errors through introduction of consistency via standard automation; and provides additional automation identification for the reuse of intellectual capital.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method to utilize Automated Ticketing (AT) Analytics to create a recommendation file of routines and to automatically create a work ticket in response to a message, the computer-implemented method comprising:

identifying, by one or more processors, messages related to a Logical Partition (LPAR) for automated ticketing to an account as a BASELINE, wherein the messages identify an operational anomaly in the LPAR used by a computer system, wherein the messages are based on sensor readings from hardware sensors and software programs within the computer system, wherein the hardware sensors are bus bandwidth sensors that detect an amount of data traffic on a system bus within the computer system, wherein the messages are sent to the one or more processors within the computer system, and wherein identified messages identify which messages are to be auto ticketed as a work ticket for the computer system;

initiating, by one or more processors, updates to rules for said automated ticketing;

in response to said updates to the rules being initiated, identifying, by one or more processors, trends using an automated message analysis and an automation routine identification to automatically trigger a generation of the work ticket;

executing, by one or more processors, an analytic routine in response to an update being made to a particular message, wherein the analytic routine comprises the automated message analysis and the automation routine identification;

automatically producing, by one or more processors, a recommendation for correcting the operational anomaly in the LPAR based on said analytic routine by automatically creating the work ticket to correct the operational anomaly;

storing, by one or more processors, said recommendation in a recommendation file;

retrieving, by one or more processors, said recommendation and applying said recommendation to a new message that describes a new operational anomaly in the LPAR;

automatically creating, by one or more processors, the work ticket to correct the new operational anomaly in the LPAR;

executing, by one or more processors, the work ticket to correct the new operational anomaly in the LPAR; and exporting, by one or more processors, the recommendation file as a z/OS feed, wherein the z/OS feed populates an LPAR message worksheet, wherein the LPAR message worksheet defines actions to be taken in response to the message, wherein the LPAR message worksheet is used as an input to mainframe processes, wherein the mainframe processes produce Message Automation Table (MAT) statements and message suppression definitions used by the mainframe processes, and wherein the MAT statements identify Virtual Telecommunication Access Method (VTAM) network performance and utilization information, determine required network changes to improve performance, identify network elements responsible for performance degradation, and enable automated responses to performance problems.

2. The computer-implemented method of claim 1, wherein the LPAR is a partition of a software program.

3. The computer-implemented method of claim 1, further comprising:
exporting, by one or more processors, the recommendation file as a comma separated value (csv) file, wherein the csv file identifies specific operational requirements of the system.

4. The computer-implemented method of claim 1, wherein the automated message analysis comprises:
identifying, by one or more processors, all accounts and LPARs where automated ticketing is deployed;
identifying and averaging, by one or more processors, messages that are coming from identified accounts and identified LPARs as a top average message list;
adding, by one or more processors, best practices messages to the top average message list;
comparing, by one or more processors, exclusions that have been defined by the LPAR to the top average message list; and
generating, by one or more processors, the recommendation file for the LPAR.

5. The computer-implemented method of claim 1, wherein the automation routine identification comprises:
receiving, by one or more processors, a selection of the messages related to the LPAR based on a description of a message routine and an ability to download an ASCII source of the message routine; and
submitting, by one or more processors, the message routine to the recommendation file.

6. A computer program product to utilize Automated Ticketing (AT) Analytics to create a recommendation file of routines and to automatically create a ticket in response to a message, the computer program product comprising a non-transitory computer readable storage medium having program code embodied therewith, the program code readable and executable by a processor to perform a method comprising:
identifying messages related to a Logical Partition (LPAR) for automated ticketing to an account as a BASELINE, wherein the messages identify an operational anomaly in the LPAR used by a computer system, wherein the messages are based on sensor readings from hardware sensors and software programs within the computer system, wherein the hardware sensors are bus bandwidth sensors that detect an amount of data traffic on a system bus within the computer system, wherein the messages are sent to one or more processors within the computer system, and wherein identified messages identify which messages are to be auto ticketed as a work ticket for the computer system;
initiating updates to rules for said automated ticketing;
in response to said updates to the rules being initiated, identifying trends using an automated message analysis and an automation routine identification to automatically trigger a generation of the work ticket, wherein the automated message analysis comprises:
identifying all accounts and LPARs where automated ticketing is deployed;
identifying and averaging messages that are coming from identified accounts and identified LPARs as a top average message list;
adding best practices messages to the top average message list;
comparing exclusions that have been defined by the LPAR to the top average message list; and
generating the recommendation file for the LPAR;
executing an analytic routine in response to an update being made to a particular message, wherein the analytic routine comprises the automated message analysis and the automation routine identification;
automatically producing a recommendation for correcting the operational anomaly in the LPAR based on said analytic routine by automatically creating the work ticket to correct the operational anomaly;
storing said recommendation in a recommendation file;
retrieving said recommendation and applying said recommendation to a new message that describes a new operational anomaly in the LPAR;
automatically creating the work ticket to correct the new operational anomaly in the LPAR; and
executing the work ticket to correct the new operational anomaly in the LPAR.

7. The computer program product of claim 6, wherein the LPAR is a partition of a software program.

8. The computer program product of claim 6, wherein the method further comprises:
exporting the recommendation file as a z/OS feed, wherein the z/OS feed populates an LPAR message worksheet, wherein the LPAR message worksheet defines actions to be taken in response to the message, wherein the LPAR message worksheet is used as an input to mainframe processes, wherein the mainframe processes produce Message Automation Table (MAT) statements and message suppression definitions used by the mainframe processes, and wherein the MAT statements identify Virtual Telecommunication Access Method (VTAM) network performance and utilization information, determine required network changes to improve performance, identify network elements responsible for performance degradation, and enable automated responses to performance problems.

9. The computer program product of claim 6, wherein the method further comprises:
exporting the recommendation file as a comma separated value (csv) file, wherein the csv file identifies specific operational requirements of the system.

10. The computer program product of claim 6, wherein the automation routine identification comprises:
receiving a selection of the messages related to the LPAR based on a description of a message routine and an ability to download an ASCII source of the message routine; and
submitting the message routine to the recommendation file.

11. A computer system comprising:
a processor, a computer readable memory, and a non-transitory computer readable storage medium;
first program instructions to identify messages related to a Logical Partition (LPAR) for automated ticketing to an account as a BASELINE, wherein the messages identify an operational anomaly in the LPAR used by a computer system, wherein the messages are based on sensor readings from hardware sensors and software programs within the computer system, wherein the hardware sensors are bus bandwidth sensors that detect an amount of data traffic on a system bus within the computer system, wherein the messages are sent to one or more processors within the computer system, and wherein identified messages identify which messages are to be auto ticketed as a work ticket for the computer system;
second program instructions to initiate updates to rules for said automated ticketing;
third program instructions to, in response to said updates to the rules being initiated, identify trends using an automated message analysis and an automation routine identification to automatically trigger a generation of the work ticket;
fourth program instructions to execute an analytic routine in response to an update being made to a particular message, wherein the analytic routine comprises the automated message analysis and the automation routine identification;
fifth program instructions to automatically produce a recommendation for correcting the operational anomaly in the LPAR based on said analytic routine by automatically creating the work ticket to correct the operational anomaly;
sixth program instructions to store said recommendation in a recommendation file;
seventh program instructions to retrieve said recommendation and apply said recommendation to a new message that describes a new operational anomaly in the LPAR;
eighth program instructions to automatically create the work ticket to correct the new operational anomaly in the LPAR;
ninth program instructions to execute the work ticket to correct the new operational anomaly in the LPAR;
tenth program instructions to identify all accounts and LPARs where automated ticketing is deployed;
eleventh program instructions to identify and average messages that are coming from identified accounts and identified LPARs as a top average message list;
twelfth program instructions to add best practices messages to the top average message list;
thirteenth program instructions to compare exclusions that have been defined by the LPAR to the top average message list; and
fourteenth program instructions to generate the recommendation file for the LPAR; and
wherein
the first, second, third, fourth, fifth, sixth, seventh, eighth, ninth, tenth, eleventh, twelfth, thirteenth, and fourteenth program instructions are stored on the non-transitory computer readable storage medium for execution by one or more processors via the computer readable memory.

12. The computer system of claim 11, further comprising:
fifteenth program instructions to export the recommendation file as a z/OS feed, wherein the z/OS feed populates an LPAR message worksheet, wherein the LPAR message worksheet defines actions to be taken in response to the message, wherein the LPAR message worksheet is used as an input to mainframe processes, wherein the mainframe processes produce Message Automation Table (MAT) statements and message suppression definitions used by the mainframe processes, and wherein the MAT statements identify Virtual Telecommunication Access Method (VTAM) network performance and utilization information, determine required network changes to improve performance, identify network elements responsible for performance degradation, and enable automated responses to performance problems; and
wherein
the fifteenth program instructions are stored on the non-transitory computer readable storage medium for execution by one or more processors via the computer readable memory.

13. The computer system of claim 11, wherein the LPAR is a partition of a software program.

14. The computer system of claim 11, further comprising:
fifteenth program instructions to export the recommendation file as a comma separated value (csv) file, wherein the csv file identifies specific operational requirements of the system;
and wherein
the fifteenth program instructions are stored on the non-transitory computer readable storage medium for execution by one or more processors via the computer readable memory.

15. The computer system of claim 11, further comprising:
fifteenth program instructions to receive a selection of the messages related to the LPAR based on a description of a message routine and an ability to download an ASCII source of the message routine; and
sixteenth program instructions to submit the message routine to the recommendation file;
and wherein
the fifteenth and sixteenth program instructions are stored on the non-transitory computer readable storage medium for execution by one or more processors via the computer readable memory.

* * * * *